US012128623B2

(12) United States Patent
Lee et al.

(10) Patent No.: US 12,128,623 B2
(45) Date of Patent: Oct. 29, 2024

(54) SINGLE-PARTICLE DISPENSING DEVICE AND SINGLE-PARTICLE DISPENSING METHOD USING SAME

(71) Applicant: KOREA INSTITUTE OF MACHINERY & MATERIALS, Daejeon (KR)

(72) Inventors: Duck Gyu Lee, Daejeon (KR); Sang Hyun Ahn, Daejeon (KR); Jun Hee Lee, Daejeon (KR); Sua Park, Daejeon (KR); Wan-Doo Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 949 days.

(21) Appl. No.: 17/260,035

(22) PCT Filed: Jul. 11, 2019

(86) PCT No.: PCT/KR2019/008607
§ 371 (c)(1),
(2) Date: Jan. 13, 2021

(87) PCT Pub. No.: WO2020/022675
PCT Pub. Date: Jan. 30, 2020

(65) Prior Publication Data
US 2021/0379899 A1     Dec. 9, 2021

(30) Foreign Application Priority Data

Jul. 28, 2018  (KR) .................. 10-2018-0086971

(51) Int. Cl.
*B41J 2/175*     (2006.01)
*B29C 64/10*     (2017.01)
(Continued)

(52) U.S. Cl.
CPC ............ *B29C 64/321* (2017.08); *B29C 64/10* (2017.08); *B29C 64/209* (2017.08);
(Continued)

(58) Field of Classification Search
CPC .................................................... B29C 64/321
See application file for complete search history.

(56) References Cited

U.S. PATENT DOCUMENTS 6,010,547 A     1/2000  Jeong et al.
6,332,540 B1 *  12/2001 Paul ................... G01N 15/1404
                                                  209/552
(Continued)

FOREIGN PATENT DOCUMENTS

JP     07-151249      6/1995
JP     2001-521439    11/2001
(Continued)

*Primary Examiner* — J C Jacyna
(74) *Attorney, Agent, or Firm* — LEX IP MEISTER, PLLC

(57) ABSTRACT

An embodiment of the present invention provides a single-particle dispensing device, including: a first syringe containing particles and fluid therein; a particle separating body connected to an outlet end of the first syringe and separating the particles from the fluid; and a container connected to the particle separating body and containing the fluid separated in the particle separating body, wherein the particle separating body includes a rotating body provided with a particle collector collecting the particle and a fluid flow path formed therein, and a fixing body provided with a nozzle discharging the particle and rotatably accommodating the rotating body therein.

5 Claims, 15 Drawing Sheets

(51) Int. Cl.
  *B29C 64/209* (2017.01)
  *B29C 64/227* (2017.01)
  *B29C 64/321* (2017.01)
  *B29C 64/386* (2017.01)
  *B33Y 10/00* (2015.01)
  *B33Y 30/00* (2015.01)
  *B33Y 40/00* (2020.01)
  *B67D 7/16* (2010.01)
  *B41J 2/14* (2006.01)

(52) U.S. Cl.
  CPC .......... *B29C 64/227* (2017.08); *B29C 64/386* (2017.08); *B33Y 10/00* (2014.12); *B33Y 30/00* (2014.12); *B33Y 40/00* (2014.12); *B67D 7/16* (2013.01); *B41J 2/14* (2013.01); *B41J 2/17506* (2013.01); *Y10T 137/86863* (2015.04)

(56) References Cited

U.S. PATENT DOCUMENTS

| | | | |
|---|---|---|---|
| 6,415,993 B1 | 7/2002 | Forbert et al. | |
| 2017/0072636 A1* | 3/2017 | Ng | B29C 64/153 |
| 2020/0338821 A1* | 10/2020 | Anegawa | B33Y 50/02 |

FOREIGN PATENT DOCUMENTS

| | | |
|---|---|---|
| KR | 10-2005-0082984 | 8/2005 |
| KR | 10-2018-0081991 | 7/2018 |

* cited by examiner

SINGLE-PARTICLE DISPENSING DEVICE AND SINGLE-PARTICLE DISPENSING METHOD USING SAME

TECHNICAL FIELD

The present invention relates to a single-particle dispensing device and a single-particle dispensing method using the same, and more particularly, to a single-particle dispensing device and a single-particle dispensing method using the same that may discharge fluid through a particle separating body, and simultaneously, may separate a single particle from the fluid, and may individually discharge the single particle at a location and time to be stacked.

BACKGROUND ART

There are various conventional dispensing devices such as a syringe, a micro pipette, and a dispenser for nano/microparticle printing depending on application.

A common feature of these devices is that they discharge a specific volume of fluid based on fluid or that when the fluid contains particles, they discharge multiple particles instead of a single particle with the fluid.

As one of conventional dispensing methods, a continuous injection method is a method that continuously discharges fluid by applying pressure to a syringe. However, the continuous injection method has a problem that it cannot implement a function of discharging a single particle.

In addition, a drop-on demand method is a method of discharging fluid having a specific volume at a desired time and position, and it loses less fluid, and may precisely discharge fluid compared to the continuous injection method.

However, it may not implement a function of discharging a single particle because a material is limited to fluid.

In addition, a high-precision particle printer that discharges fluid containing particles by combining a particle printer method and the drop-on demand method, discharges a fluid droplet having a specific volume in which many particles are included.

However, the particle printer method may not adjust the number of the particles included in the fluid droplet, and thus it may not implement a function of discharging a single particle.

As described above, the conventional dispensing methods have a problem that they may not separate fluid and particles.

To solve this problem, Japanese Patent Laid-Open Publication No. 2017-154411 proposed a method of separating particles according to their size through a separator in order to separate a mixture of particles of various sizes.

However, in the above patent, a function of separating the particles mixed in the mixture one by one cannot be implemented, and accordingly, a single particle cannot be individually discharged at a position and time to be stacked.

DISCLOSURE

Technical Problem

An aspect of the present invention provides a single-particle dispensing device and a single-particle dispensing method using the same that may discharge fluid through a particle separating body, and simultaneously, may separate a single particle from the fluid, and may individually discharge the single particle at a location and time to be stacked.

Technical Solution

An embodiment of the present invention provides a single-particle dispensing device, including: a first syringe containing particles and fluid therein; a particle separating body connected to an outlet end of the first syringe and separating the particles from the fluid; a container connected to the particle separating body and containing the fluid separated in the particle separating body; and an air compressor connected to the particle separating body and injecting compressed air into the particle separating body to discharge the particle separated in the particle separating body, wherein the particle separating body includes a rotating body provided with a particle collector collecting the particle and a fluid flow path formed therein, and a fixing body provided with a nozzle discharging the particle and rotatably accommodating the rotating body therein.

Here, a pressure sensor measuring a pressure inside the first syringe, and a vacuum pump connected to the container and moving the particles and the fluid contained inside the first syringe in the particle separating body, may be further included, wherein the rotating body may rotate based on the pressure measured by the pressure sensor to move the separated fluid to the container or to discharge the separated particle to the nozzle.

In addition, the fixing body may be provided with a first hole formed in a first area connected to the first syringe, a second hole formed in a second area facing the first area and connected to the container, and a third hole formed between the first hole and the second hole and formed in a third area connected to the air compressor, and the nozzle may be formed in a fourth area facing the third area.

In addition, when the pressure inside the first syringe measured by the pressure sensor is changed, the rotating body may be disposed inside the fixing body in a first disposition structure in which the particle collector is connected to the first hole and the fluid flow path is connected to the second hole, and when the pressure inside the first syringe measured by the pressure sensor is not changed, the rotating body may be disposed inside the fixing body in a second disposition structure in which the particle collector is connected to the nozzle and the fluid flow path is connected to the third hole.

In addition, when the rotating body is disposed inside the fixing body in the second disposition structure, the air compressor may inject compressed air toward the fluid flow path to discharge the particle in the particle collector through the nozzle.

Another embodiment of the present invention provides a single-particle dispensing device, including: a first syringe containing particles and fluid therein; a particle separating body that is connected to an outlet end of the first syringe and separates the particles from the fluid; a container that is connected to the particle separating body and contains the fluid separated in the particle separating body; and a second syringe connected to the container to suck the particles and the fluid and to discharge, when the particle and the fluid are separated in the particle separating body, a separated particle, wherein the particle separating body includes a rotating body that is provided with a particle collector collecting the particle and inside which a fluid flow path is formed, and a fixing body that is provided with a nozzle from which the particle is discharged and inside which the rotating body is contained.

Here, a pressure sensor measuring a pressure inside the first syringe may be further included, wherein the rotating body may rotate based on the pressure measured by the pressure sensor to move the separated fluid to the container or to discharge the separated particle to the nozzle.

In addition, the fixing body may be provided with a fifth hole connected to a fifth area connected to the first syringe, and a sixth hole formed in a sixth area connected to the container, and the nozzle may be formed in a seventh area of the fixing body.

In addition, when the pressure inside the syringe measured by the pressure sensor is changed, the rotating body may be disposed inside the fixing body in a third disposition structure in which the particle collector is connected to the fifth hole and the fluid flow path is connected to the sixth hole, and when the pressure inside the syringe measured by the pressure sensor is not changed, the rotating body may be disposed inside the fixing body in a fourth disposition structure in which the particle collector is connected to the nozzle and the fluid flow path is connected to the sixth hole.

In addition, when the rotating body is disposed inside the fixing body in the third disposition structure, the second syringe may suck the particle and the fluid, and when the rotating body is disposed inside the fixing body in the fourth disposition structure, the second syringe may discharge the particle through the nozzle.

In addition, an embodiment of the present invention provides a single-particle dispensing method that drives a single-particle dispensing device including: a syringe containing particles and fluid therein, and a particle separating body separating the particle from the fluid; an air compressor discharging the particle separated in the particle separating body; and a vacuum pump moving the particles and the fluid contained inside the syringe in the particle separating body, wherein the particle separating body includes a rotating body and a fixing body, the single-particle dispensing method including: moving a mixture in which the vacuum pump is operated so that the particles and the fluid contained inside the syringe move to the rotating body inside the fixing body; separating a particle in which the particle and the fluid are separated by a particle collector formed on the rotating body; measuring an air pressure inside the syringe; rotating a rotating body in which the rotating body rotates inside the fixing body when the air pressure is not changed; and discharging a particle in which the air compressor connected to the fixing body is driven to discharge the particle separated by the particle collector to the outside through the nozzle of the fixing body, wherein in the rotating of the rotating body, the rotating body is rotated in a direction in which the particle collector and the nozzle are connected to each other.

In addition, another embodiment of the present invention provides a single-particle dispensing method that drives a single-particle dispensing device including a first syringe containing particles and fluid therein, and a particle separating body connected to the first syringe to separate the particle from the fluid, wherein the particle separating body includes a rotating body, and a fixing body rotatably accommodating the rotating body therein, the single-particle dispensing method including: moving a mixture of the particles and the fluid contained in the first syringe to the rotating body; separating the particle from the fluid through a particle collector formed on the rotating body; measuring an air pressure inside the first syringe; rotating the rotating body inside the fixing body when the air pressure is not changed; and discharging the particle separated by the particle collector to the outside through a nozzle of the fixing body, wherein in the rotating of the rotating body, the rotating body is rotated in a direction in which the particle collector and the nozzle are connected to each other.

Here, in the measuring of the air pressure, when the air pressure is changed, the fluid may move through a fluid flow path that is formed inside the rotating body and connected to the particle collector.

Advantageous Effects

A single-particle dispensing device and a single-particle dispensing method using the same according to an embodiment of the present invention have the following effects.

First, there is an advantage of being able to discharge fluid through a particle separating body, and simultaneously, to separate a single particle from the fluid, and to individually discharge the single particle at a location and time to be stacked.

Second, there is an advantage that a structure with higher precision may be formed by being able to individually discharge a single particle at a position and time to be stacked.

MODE FOR INVENTION

Figure 1:
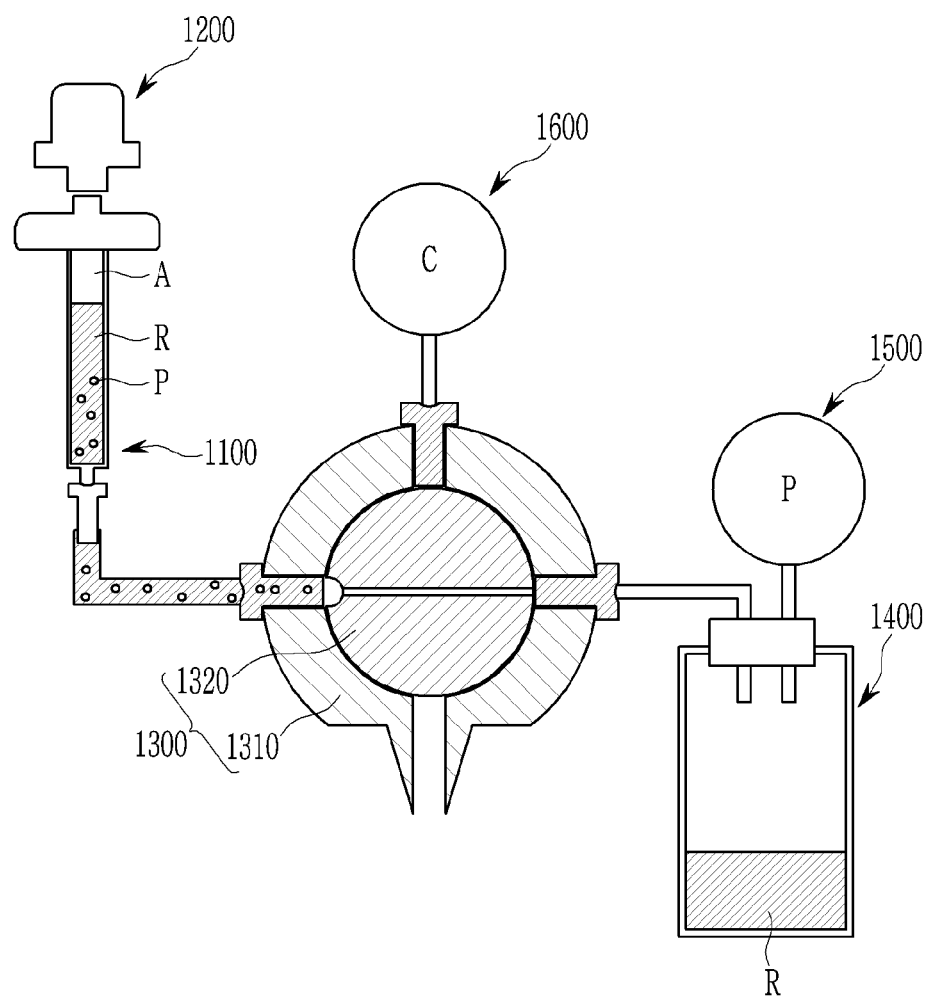
FIG. 1 illustrates an entire schematic view of a single-particle dispensing device according to an embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, the size and thickness of each element are arbitrarily illustrated for ease of description, and the present disclosure is not necessarily limited to those illustrated in the drawings.

Throughout this specification and the claims that follow, when it is described that an element is "coupled or connected" to another element, the element may be "directly coupled or connected" to the other element or "indirectly coupled or connected" to the other element through a third element. In addition, unless explicitly described to the contrary, the word "comprise" and variations such as "comprises" or "comprising" will be understood to imply the inclusion of stated elements but not the exclusion of any other elements.

Figure 2:
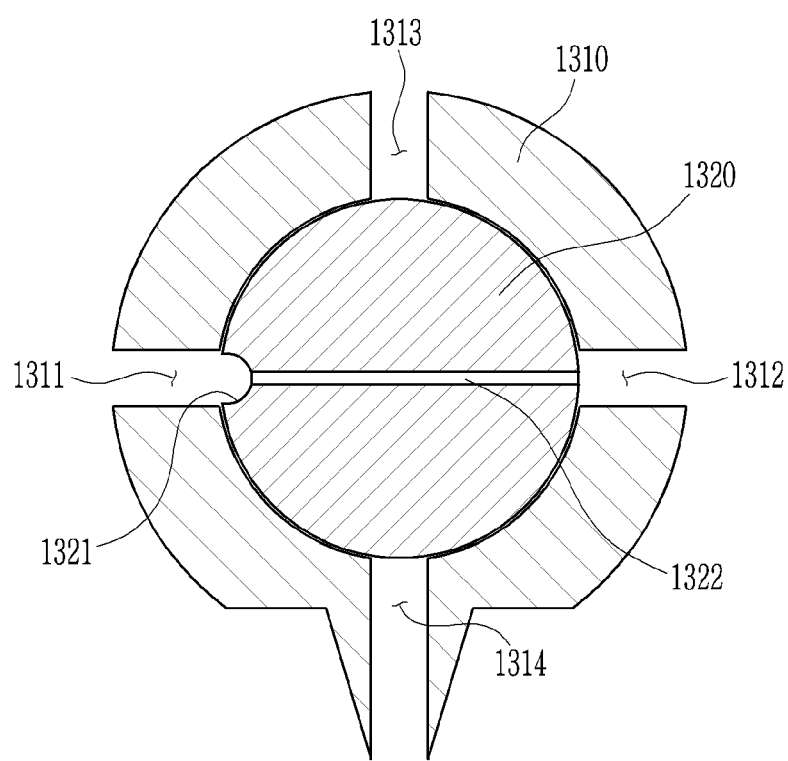
FIG. 2 illustrates a particle separating body of the single-particle dispensing device of FIG. 1.
Figure 3:
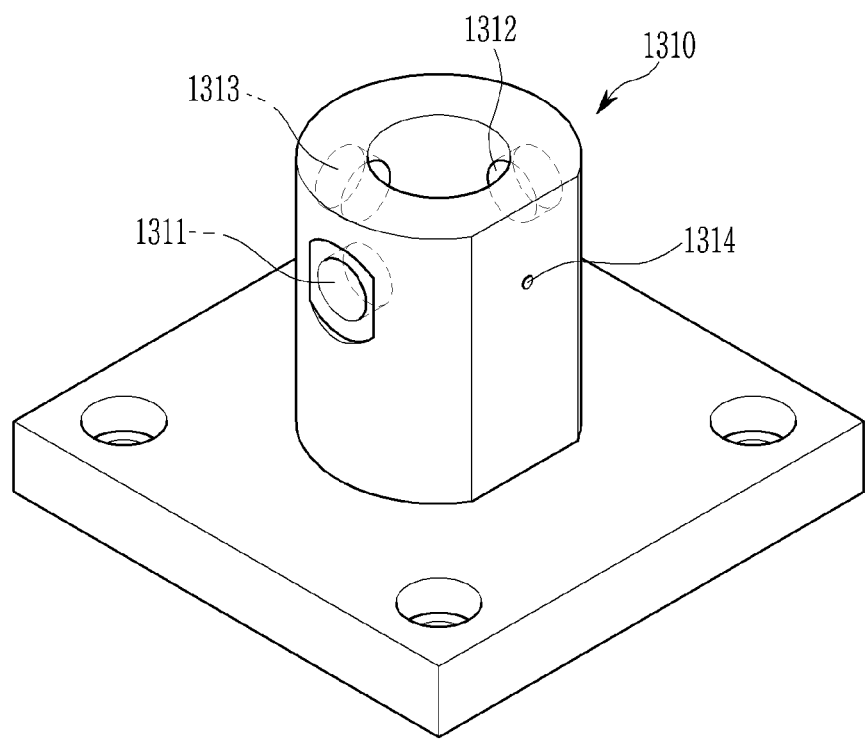
FIG. 3 and FIG. 4 illustrate a fixing body of the particle separating body of FIG. 2.
Figure 4:
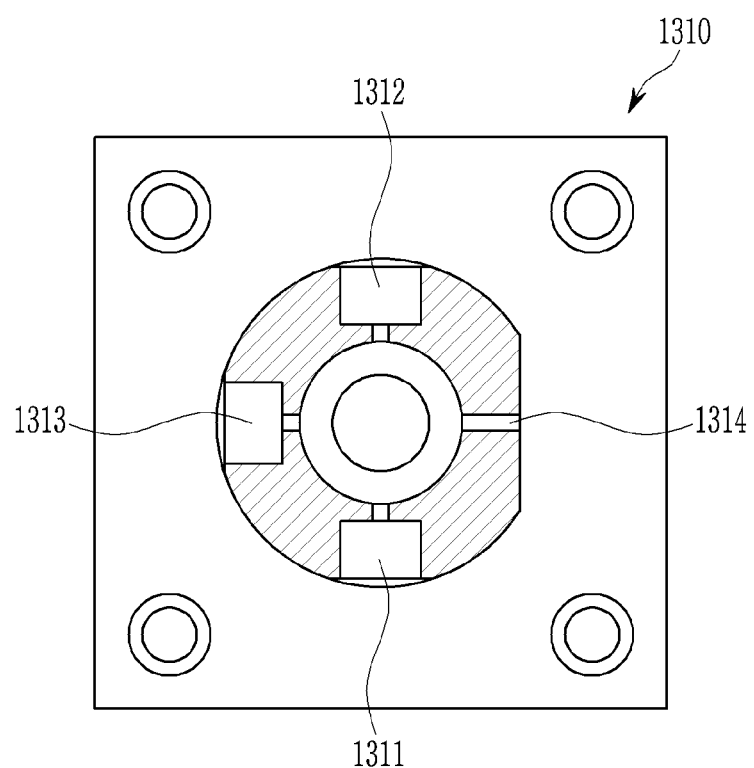
Figure 5:
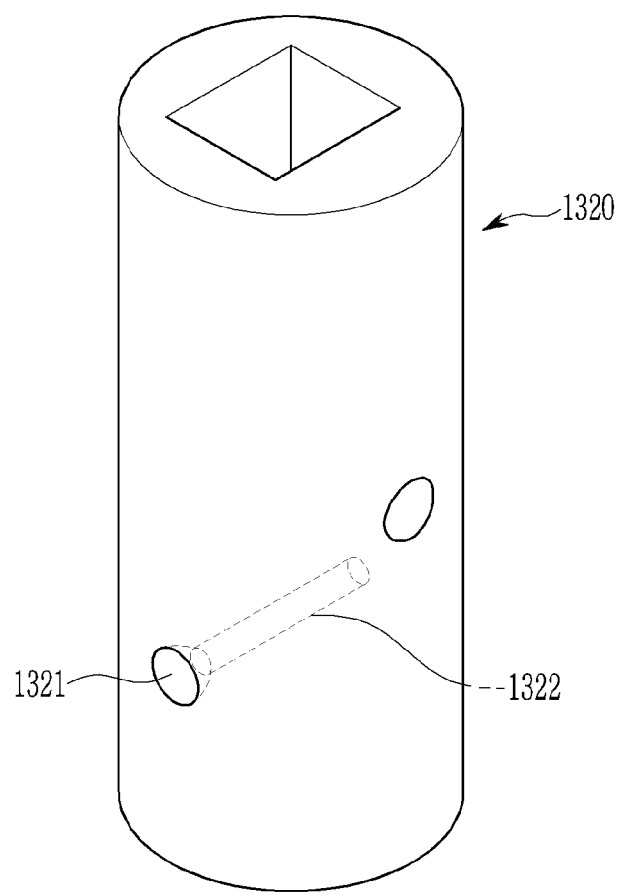
FIG. 5 and FIG. 6 illustrate a rotating body of the particle separating body of FIG. 2.
Figure 6:
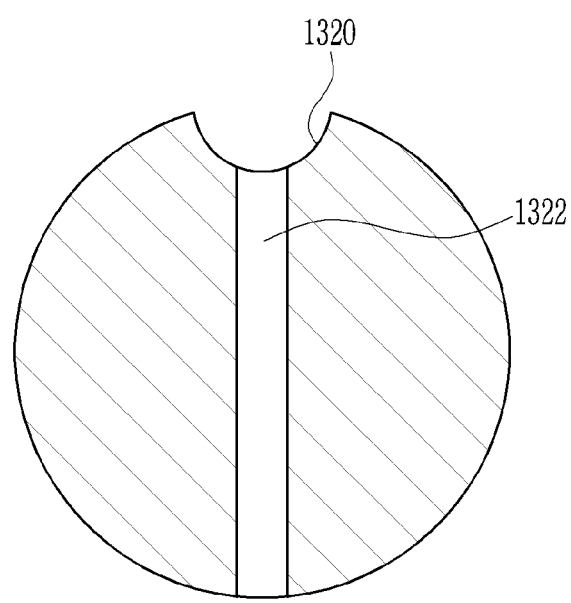
Figure 7:
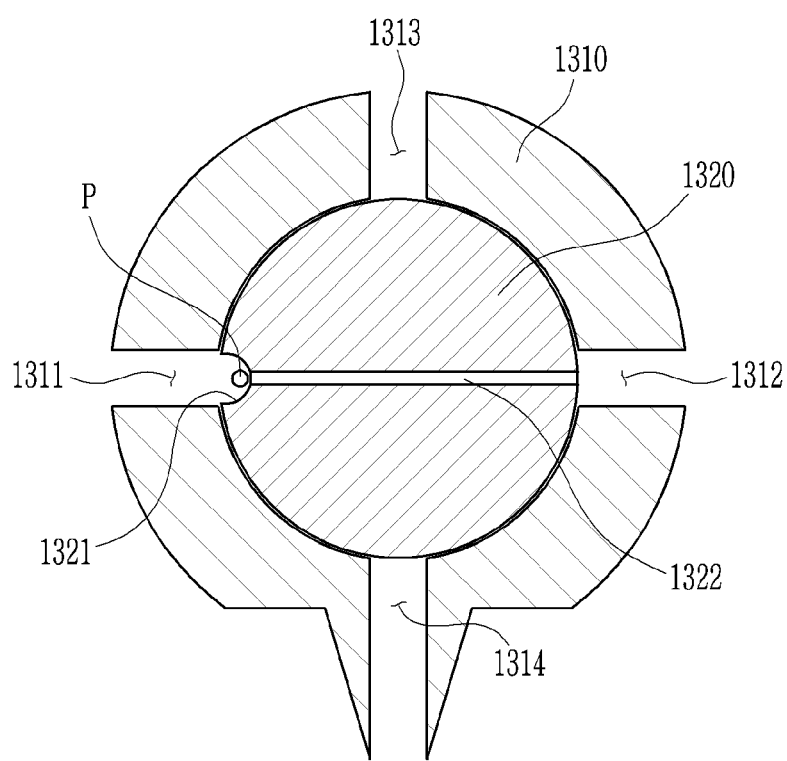
FIGS. 7 and 8 are drawings for explaining an operation of the single-particle dispensing device of FIG. 1.
Figure 8:
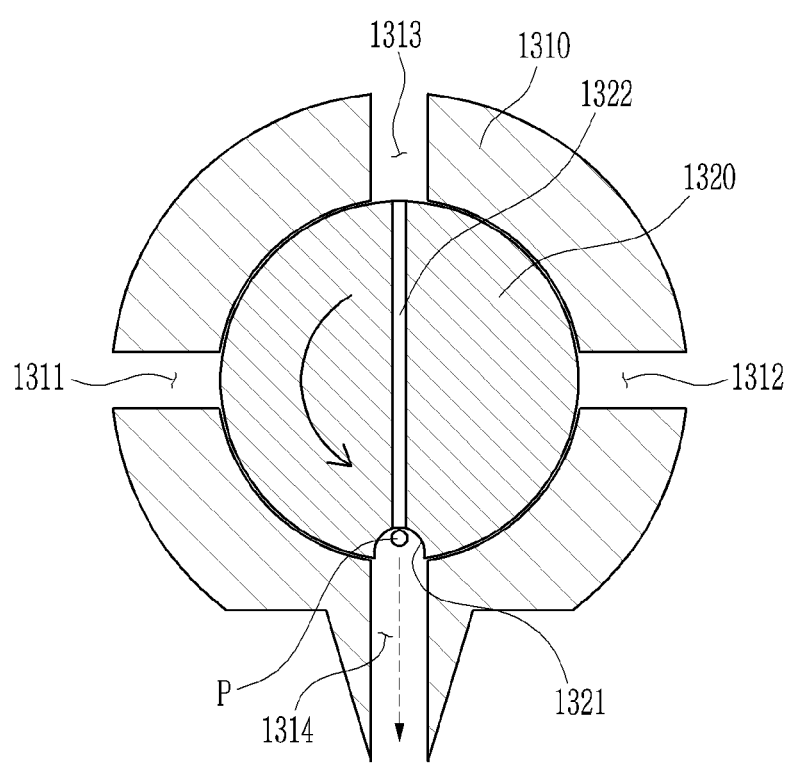

FIG. 1 illustrates an entire schematic view of a single-particle dispensing device according to an embodiment of the present invention, FIG. 2 illustrates a particle separating body of the single-particle dispensing device of FIG. 1, FIG. 3 and FIG. 4 illustrate a fixing body of the particle separating body of FIG. 2, FIG. 5 and FIG. 6 illustrate a rotating body of the particle separating body of FIG. 2, and FIG. 7 and FIG. 8 are drawings for explaining an operation of the single-particle dispensing device of FIG. 1.

Hereinafter, a single-particle dispensing device according to an embodiment of the present invention will be described with reference to FIG. 1 to FIG. 8.

First, as shown in FIG. 1, a single-particle dispensing device according to an embodiment of the present invention includes a syringe 1100, a pressure sensor 1200, a particle separating body 1300, a container 1400, a vacuum pump 1500, and an air compressor 1600.

Particles (P) and fluid (R) that are dispensed are contained in the syringe 1100, and an outlet end of the syringe 1100 is connected to the particle separating body 1300.

The pressure sensor 1200 measures an air pressure inside the syringe 1100, which is changed as the particles (P) and the fluid (R) contained in the syringe 1100 are discharged from the syringe 1100, and the particle separating body 1300 rotates based on the air pressure in the syringe 1100 measured by the pressure sensor 1200, and a detailed description of this will be described later.

The particle separating body 1300 is connected to the outlet end of the syringe 1100, and the particles (P) and the fluid (R) contained in the syringe 1100 are moved to an inner space of the particle separating body 1300 by the vacuum pump 1500 described later.

Specifically, the particle separating body 1300 includes a fixing body 1310 and a rotating body 1320, and the fixing body 1310 and the rotating body 1320 will be described with reference to FIG. 2 to FIG. 6.

First, as shown in FIG. 2 to FIG. 4, the fixing body 1310 is formed to have a ring-shaped cross-sectional shape, is connected to the syringe 1100, the container 1400, and the air compressor 1600, and is provided with a nozzle 1314 from which the particles (P) separated from the rotating body 1320 to be described later are discharged. For example, the fixing body 1310 may be formed in a cylindrical shape with an empty inside.

The fixing body 1310 is divided into a first area, a second area, a third area, and a fourth area in a cross-sectional view.

The first area is connected to the syringe 1100, and a first hole 1311 is formed therein so that the fluid (R) and the particles (P) moving from the outlet end of the syringe 1100 may move.

The second area is disposed at a position facing the first area, and is connected to the container 1400, which will be described later, and a second hole 1312 is formed therein so that the fluid (R) passing through the rotating body 1320 may move to the container 1400 side.

The third area is disposed between the first area and the second area, and a third hole 1313 connected to the air compressor 1600 is formed therein.

The fourth area is disposed at a position facing the third area, and the nozzle 1314 is formed therein.

In addition, as shown in FIG. 2, FIG. 5, and FIG. 6, the rotating body 1320 is formed in a circular cylindrical shape, and may be rotated around the fixing body 1310 inside the fixing body 1310. A rotation direction of the rotating body 1320 is determined based on the air pressure measured by the pressure sensor 1200, and a detailed description thereof will be described later.

In addition, a particle collector 1321 and a fluid flow path 1322 are formed in the rotating body 1320, so that the fluid (R) and the particles (P) move inside the rotating body, and simultaneously, the fluid (R) and the particles (P) are separated.

The particle collector 1321 may be formed in a shape of a groove that opens one end of the rotating body 1320. For example, the particle collector 1321 may be formed in a groove shape that circularly opens one area of an outer circumferential surface of the rotating body 1320 of a circular cylindrical shape, and is concave in a radial direction of the rotating body 1320. The fluid (R) and the particles (P) move inside the particle collector 1321, and a diameter of the particle collector 1321 is larger than that of the particle (P).

The fluid flow path 1322 includes one end connected to the particle collector 1321 and the other end formed to open the other end of the rotating body 1320, the fluid (R) moves inside the fluid flow path, and a diameter of the fluid flow path 1322 is smaller than that of the particle (P). For example, as shown in FIG. 5 and FIG. 6, the fluid flow path 1322 is connected to the particle collector 1321 opening one end of the rotating body 1320 to be able to be formed in a straight line shape to open the other end of the rotating body 1320 facing the particle collector 1321.

That is, when the fluid (R) and the particles (P) move inside the rotating body 1320 by the vacuum pump 1500, the fluid (R) and the particles (P) simultaneously move in the particle collector 1321, and in this case, the particles (P) stay in the particle collection part 1321 by a difference between the diameter of the fluid flow path 1322 and the diameter of the particle (P), and the fluid (R) moves to the other end of the rotating body 1320 along the fluid flow path 1322, thus the fluid (R) and the particles (P) are separated.

In this case, the particles (P) close one end of the fluid flow path 1322, that is, an inlet end of the fluid flow path 1322, so that an operation of the vacuum pump 1500 does not affect the syringe 1100, thus the movement of the fluid (R) and the particles (P) from moving from the syringe 1100 to the particle separating body 1300 is stopped.

The container 1400 is connected to the second hole 1312 of the fixing body 1310, and the fluid (R) moving through the particle collector 1321 and the fluid flow path 1322 is contained therein.

The vacuum pump 1500 is connected to the container 1400, and creates a vacuum inside the container 1400 so that the particles (P) and the fluid (R) contained in the syringe 1100 may move toward the rotating body 1320.

The air compressor 1600 is connected to the third hole 1313 of the fixing body 1310, and injects compressed air into the fluid flow path 1322 to discharge the particles (P) separated from the particle collector 1321 to the outside of the fixing body 1310.

An operation of the single-particle dispensing device according to the embodiment of the present invention will be described as follows with reference to FIG. 7 and FIG. 8.

First, as the vacuum pump 1500 is driven and the fluid (R) contained in the syringe 1100 moves to the fluid flow path 1322, an air volume (A in FIG. 1) inside the syringe 1100 increases, and at this time, the pressure sensor 1200 measures a pressure inside the syringe 1100 to sense a change in pressure inside the syringe 1100.

In this case, the rotating body 1320 is disposed inside the fixing body 1310 to have a first disposition structure in which the particle collector 1321 is connected to the first hole 1311 and the fluid flow path 1322 is connected to the second hole 1312 as shown in FIG. 7, so that the rotating body 1320 may allow the fluid (R) to move from the particle collector 1321 to the fluid flow path 1322 to be contained in the container 1400.

As described above, when the fluid (R) moves through the particle collector 1321 and the fluid flow path 1322 formed in the rotating body 1320 and the fluid (R) and the particles (P) simultaneously move, the particles (P) block an entrance end of the particle collector 1321.

Accordingly, since the operation of the vacuum pump 1500 does not affect the syringe 1100, the movement of the fluid (R) and the particles (P) moving from the syringe 1100 to the particle separating body 1300 is stopped.

When the air volume inside the syringe 1100 is not changed as the movement of the fluid (R) and the particles (P) stops, since the pressure sensor 1200, which measures a pressure inside the syringe 1100, senses the state in which the pressure inside the syringe 1100 is not changed, it is possible to grasp that the particle (P) is separated to the particle collector 1321.

Thereafter, as shown in FIG. 8, the rotating body 1320 is rotated and disposed inside the fixing body 1310 to have a second disposition structure in which the particle collector 1321 is connected to the nozzle 1314 and the fluid flow path 1322 is connected to the third hole 1313.

Then, the air compressor 1600 connected to the third hole 1313 injects compressed air to the particle collector 1321 through the fluid flow path 1322, so that the separated particles (P) may be discharged to the outside of the separating body 1300 through the nozzle 1314.

As described above, the particles (P) may be separated from the fluid (R), and the single particle (P) may be individually discharged at the position and time to be stacked.

In FIG. 1 to FIG. 8, the case in which one syringe 1100 and one container 1400 are connected to one particle separating body 1300 is illustrated as an example, but the present invention is not limited thereto. That is, although not shown in the drawing, a plurality of syringes or a plurality of containers may be connected to one particle separating body 1300, or a plurality of syringes and a plurality of containers corresponding thereto may be connected to one particle separating body 1300 together.

Figure 9:
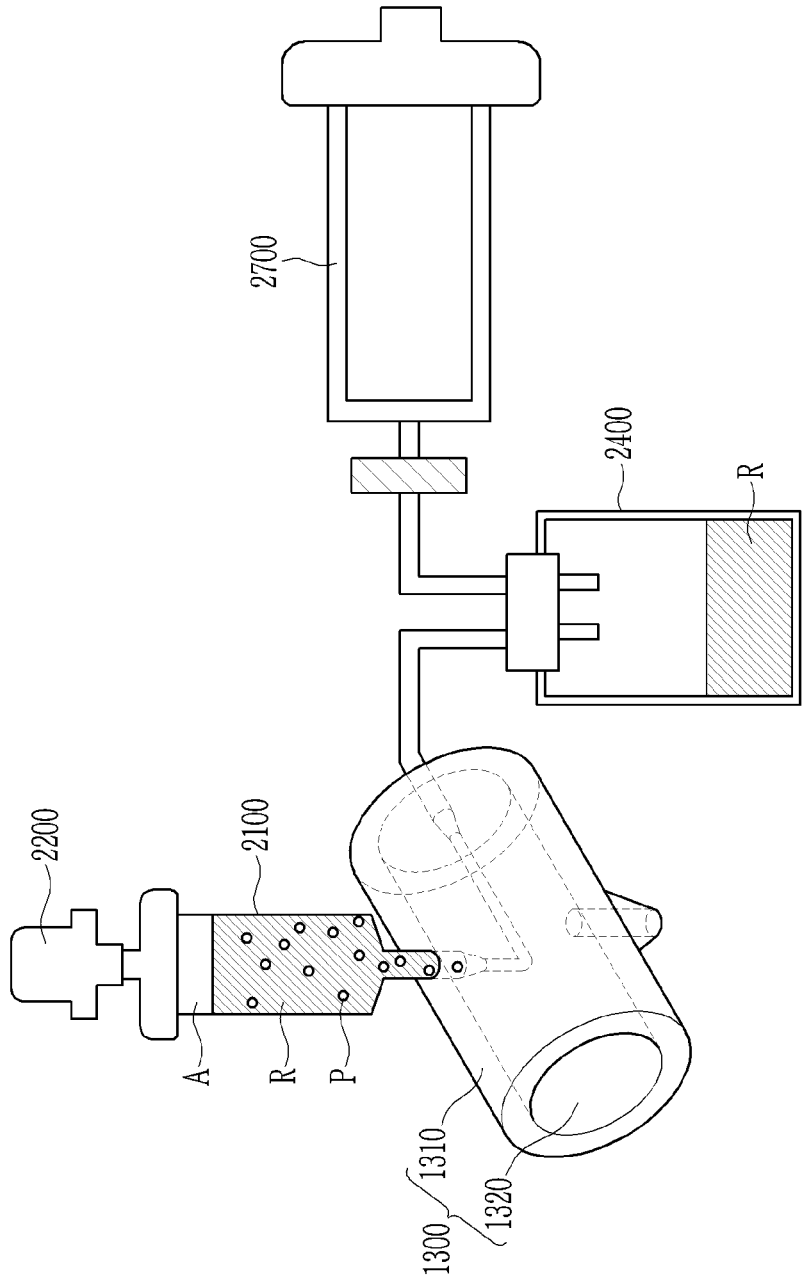
FIG. 9 illustrates an entire schematic view of a single-particle dispensing device according to another embodiment of the present invention.
Figure 10:
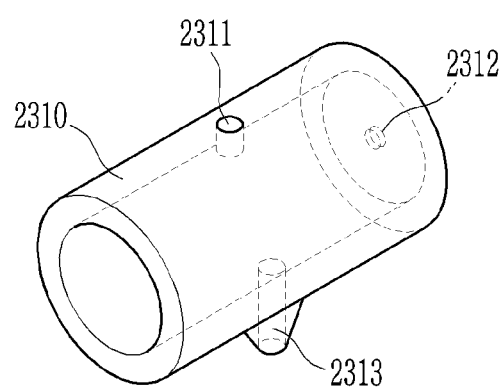
FIG. 10 illustrates a fixing body of the single-particle dispensing device of FIG. 9.
Figure 11:
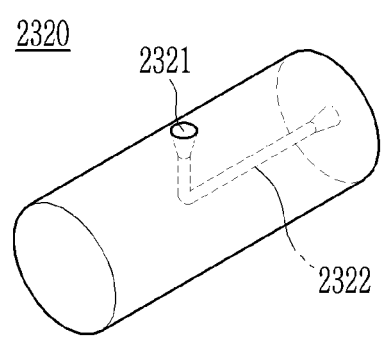
FIG. 11 illustrates a rotating body of the single-particle dispensing device of FIG. 9.
Figure 12:
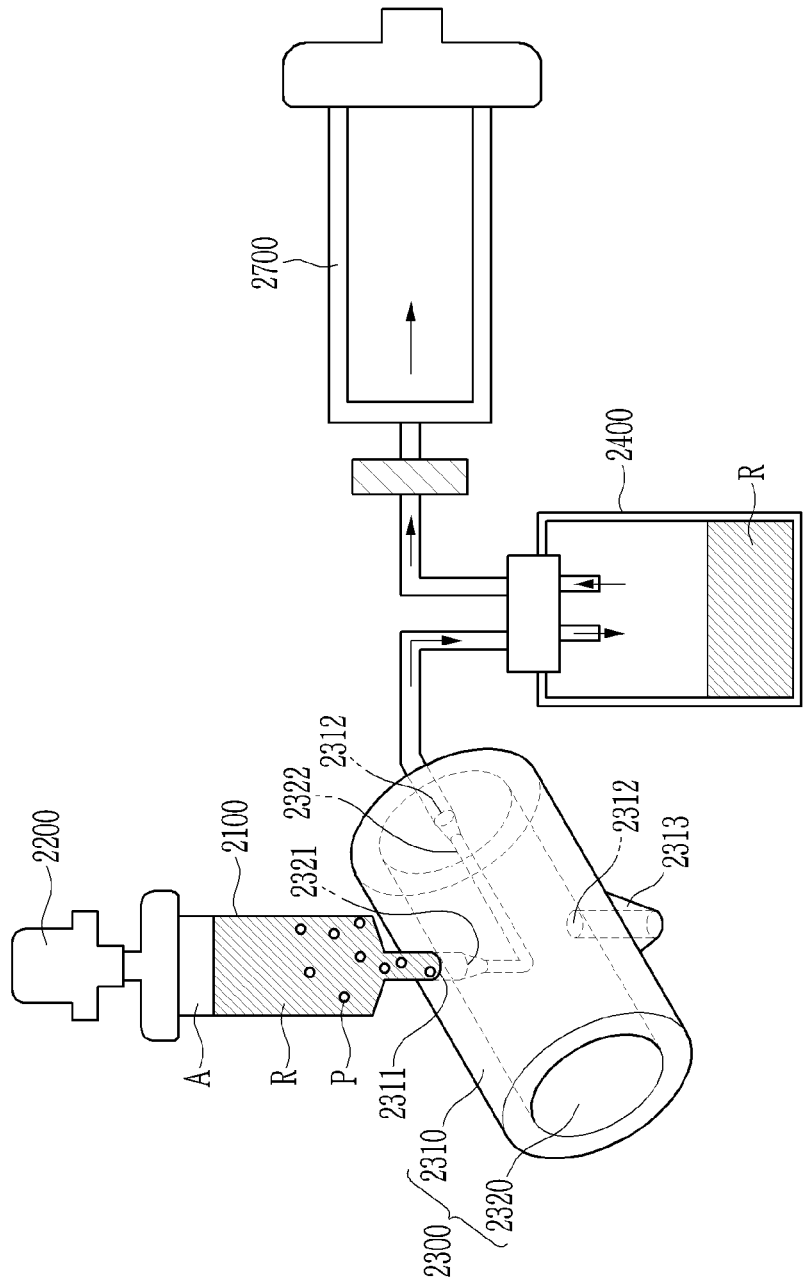
FIG. 12 and FIG. 13 are drawings for explaining an operation of the single-particle dispensing device of FIG. 9.
Figure 13:
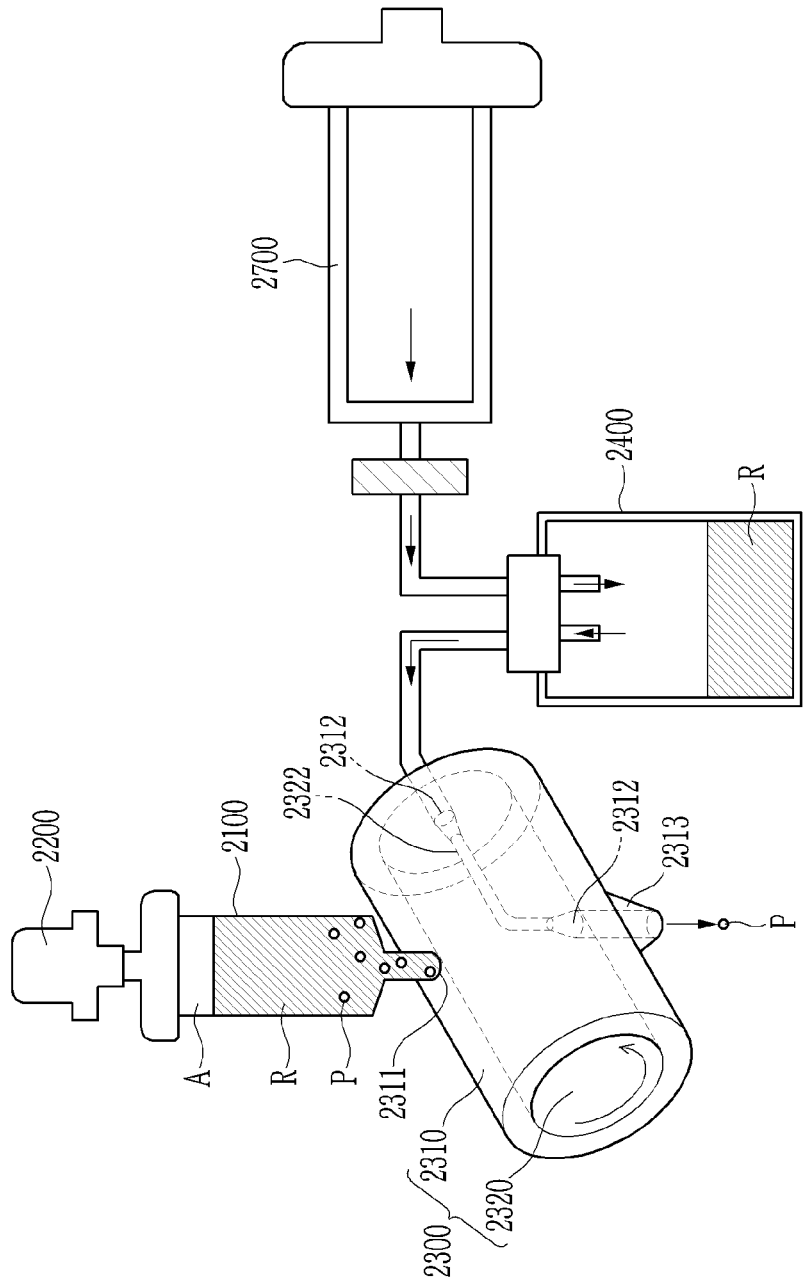

FIG. 9 illustrates an entire schematic view of a single-particle dispensing device according to another embodiment of the present invention, FIG. 10 illustrates a fixing body of the single-particle dispensing device of FIG. 9, FIG. 11 illustrates a rotating body of the single-particle dispensing device of FIG. 9, and FIG. 12 and FIG. 13 are drawings for explaining an operation of the single-particle dispensing device of FIG. 9.

A single-particle dispensing device according to another embodiment of the present invention will be described as follows with reference to FIG. 9 to FIG. 13.

The single-particle dispensing device according to the present embodiment includes a first syringe 2100, a particle separating body 2300, a container 2400, a second syringe 2700, and a pressure sensor 2200.

Particles (P) and fluid (R) that are dispensed are contained in the first syringe 2100, and an outlet end of the first syringe 2100 is connected to the particle separating body 2300.

The pressure sensor 2200 measures an air pressure inside the first syringe 2100, which is changed as the particles (P) and the fluid (R) contained in the first syringe 2100 are discharged from the first syringe 2100, and a rotating body 2320 included in the particle separating body 2320 rotates based on the air pressure in the first syringe 2100 measured by the pressure sensor 2200, and a detailed description thereof will be given later.

The particle separating body 2300 is connected to the outlet end of the first syringe 2100, and the particles (P) and the fluid (R) contained in the first syringe 2100 are moved to the inside of the particle separating body 2300 by suction driving of the second syringe 2700 to be described later.

Here, the suction driving of the second syringe 2700 means that an inner space of the second syringe 2700 is expanded, and accordingly, the air in the container 2400 moves to the second syringe 2700, and thus, the particles (P) and the fluid (R) inside the first syringe 2100 move into the particle separating body 2300.

Specifically, the particle separating body 2300 includes a fixing body 2310 and a rotating body 2320, and the fixing body 2310 and the rotating body 2320 will be described as follows with reference to FIG. 9 to FIG. 11.

The fixing body 2310, as shown in FIG. 9 and FIG. 10, is formed to have a ring-shaped cross-sectional shape, and is connected to the first syringe 2100 and the container 2400.

Specifically, the fixing body 2310 is formed in a cylindrical shape with an empty inside, and is divided into a fifth area, a sixth area, and a seventh area.

The fifth area corresponds to a portion of an outer circumferential surface of the fixing body 2310, is connected to the first syringe 2100, and is provided with a fifth hole 2311 formed so that the fluid (R) and the particles (P) moving from the outlet end of the first syringe 2100 may move into the rotating body 2320.

The sixth area corresponds to an end area of the fixing body 2310, is connected to the container 2400, and is provided with a sixth hole 2312 formed so that the fluid (R) through the inside of the rotating body 2320 may move toward the container 2400.

The seventh area corresponds to the other area of the outer circumferential surface of the fixing body 2310, and is provided with a nozzle 2313 that discharges the particles (P).

In this case, it is preferable that positions of the fifth hole 2311 and the nozzle 2313 are positioned to face each other in the fixing body 2310.

The rotating body 2320 is formed in a circular cylindrical shape, and may be rotated around the fixing body 2310 inside the fixing body 2310. A rotation direction of the rotating body 2320 is determined based on the air pressure inside the first syringe 2100 measured by the pressure sensor 2200, and a detailed description thereof will be described later.

In addition, the rotating body 2320 is provided with a particle collector 2321 and a fluid flow path 2322.

The particle collector 2321 may be formed in a shape of a groove that opens one area of the outer circumferential surface of the rotating body 2320. For example, the particle collector 2321 may be formed in a groove shape that circularly open one area of the outer circumferential surface of the rotating body 2320, and is concave in a radial direction of the rotating body 1320. The fluid (R) and the particles (P) move inside the particle collector 2321, and a diameter of the particle collector 2321 is larger than that of the particle (P).

The fluid flow path 2322 includes one end connected to the particle collector 2321 and the other end that opens an end portion of the rotating body 2320, and the fluid (R) moves therein, and a diameter of the fluid flow path 2322 is smaller than that of the particle (P).

In addition, the particle collector 2321 and the fluid flow path 2322 are formed in an 'L' shape as shown in FIG. 11. For example, as shown in FIG. 11, one end of the fluid flow path 2322 is connected to the particle collector 1321 to extend in the radial direction of the rotating body 2320 to be bent to extend in a rotation axis direction of the rotating body 2320, and the other end of the fluid flow path 2322 may be formed to open an end portion of the rotating body 2320.

That is, when the fluid (R) and the particles (P) move inside the rotating body 2320 by the second syringe 2700, they simultaneously move in the particle collector 2321, and the particles (P) stay in the particle collector 2321, while the fluid (R) moves along the fluid flow path 2322 toward the end portion of the rotating body 2320, so that the fluid (R) and the particles (P) are separated.

In this case, the particles (P) close one end of the fluid flow path 2322, that is, an inlet end of the fluid flow path 2322, so that the suction driving of the second syringe 2700 does not affect the first syringe 2100, thus the movement of the fluid (R) and the particles (P) moving from the first syringe 2100 to the particle separating body 2300 is stopped.

The container 2400 is connected to the sixth hole 2312 of the fixing body 2310, and contains the fluid (R) moving from the sixth hole 2312.

The second syringe 2700 is connected to the container 2400, and the particles (P) and the fluid (R) move toward the rotating body 2320 during the suction driving, and the particles (P) separated by the rotating body 2320 are discharged to the outside of the fixing body 2310 during the discharge driving. Here, the discharge driving of the second syringe 2700 means compressing the inner space of the second syringe 2700, and accordingly, the air inside the second syringe 2700 moves to the container 2400, and the air inside the container 2400 moves from the fluid flow path 2322 to the particle collector 2321.

An operation of the single-particle dispensing device according to the embodiment of the present invention will be described as follows with reference to FIG. 12 to FIG. 13.

First, as the second syringe 2700 is suction-driven and the particles (P) and the fluid (R) contained in the first syringe 2100 move to the fluid flow path 2322, an air volume (A in FIG. 12) inside the first syringe 2100 increases, and at this time, the pressure sensor 2200 measures a pressure inside the first syringe 2100 to sense a change in pressure inside the first syringe 2100.

In this case, the rotating body 2320 is disposed inside the fixing body 2310 to have a third disposition structure in which the particle collector 2321 is connected to the fifth hole 2311 and the fluid flow path 2322 is connected to the sixth hole 2312 as shown in FIG. 12, so that the fluid (R) moves through the particle collector 2321 and the fluid flow path 2322 to be contained in the container 2400.

As described above, when the fluid (R) moves through the particle collector 2321 and the fluid flow path 2322 formed in the rotating body 2320, and when the fluid (R) and the particles (P) simultaneously move, the particles (P) close the inlet end of the fluid flow path 2322, and thus the suction driving of the second syringe 2700 does not affect the first syringe 2100, so that the movement of the fluid (R) and the particles (P) moving from the first syringe 2100 to the particle separating body 2300 is stopped.

When the air volume inside the first syringe 1100 is not changed as the movement of the fluid (R) and the particles (P) stops, since the pressure sensor 2200 measures the pressure inside the first syringe 2100 to sense that the pressure inside the first syringe 2100 is not changed, it is possible to grasp that the particle (P) is separated into the particle collector 2321.

As shown in FIG. 13, in order to discharge the separated particles (P), the rotating body 2320 is rotated and disposed inside the fixing body 2310 to have a fourth disposition structure in which the particle collector 2321 is connected to the nozzle 2313 and the fluid flow path 2322 is connected to the sixth hole 2312.

Thereafter, the second syringe 2700 is discharge-driven, and thus air moves from the fluid flow path 2322 in a direction of the particle collector 2321 such that the separated particles (P) in the particle collector 2321 may be discharged to the outside of the fixing body 2310 through the nozzle 2313.

As described above, the particles (P) may be separated from the fluid (R), and the single particle (P) may be individually discharged at the position and time to be stacked.

Meanwhile, in FIG. 9 to FIG. 13, the case in which one first syringe 2100 and one container 2400 are connected to one particle separating body 2300 is illustrated as an example, but the present invention is not limited thereto. That is, although not shown in the drawing, a plurality of first syringes or a plurality of containers may be connected to one particle separating body 2300, or a plurality of first syringes and a plurality of containers corresponding thereto may be connected to one particle separating body 1300 together.

Figure 14:
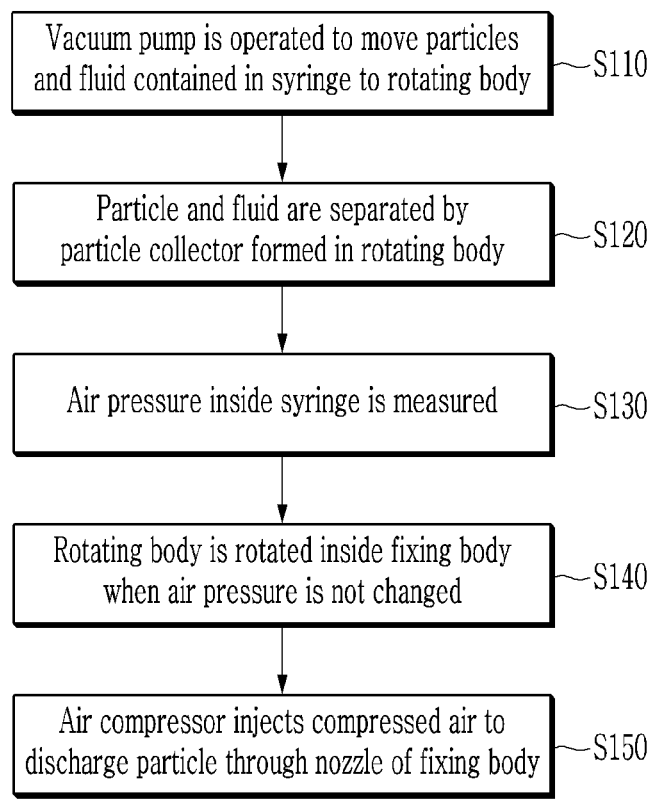
FIG. 14 illustrates a flowchart of a single-particle dispensing method according to an embodiment of the present invention.
Figure 15:
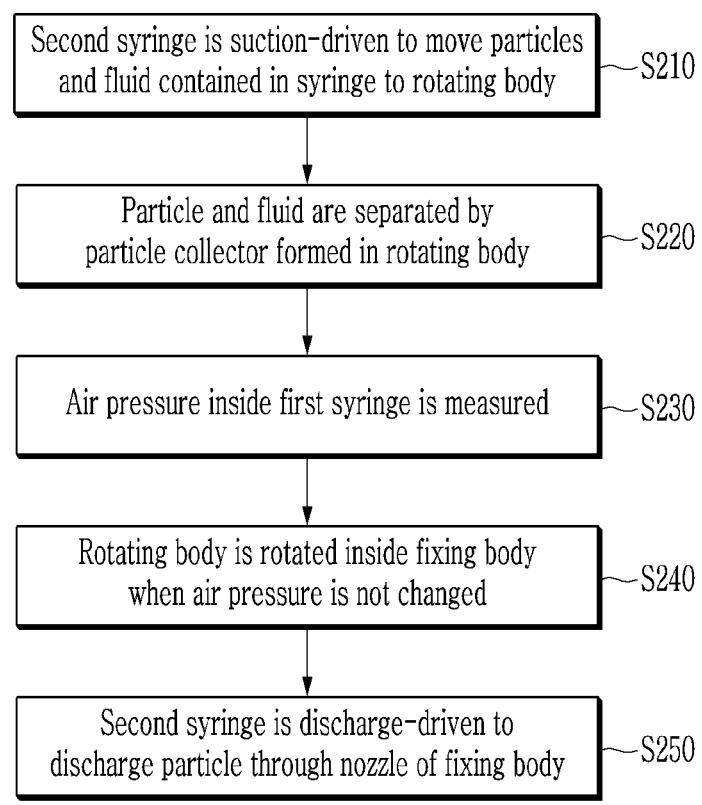
FIG. 15 illustrates a flowchart of a single-particle dispensing method according to another embodiment of the present invention.

FIG. 14 illustrates a flowchart of a single-particle dispensing method according to an embodiment of the present invention, and FIG. 15 illustrates a flowchart of a single-particle dispensing method according to another embodiment of the present invention.

A single-particle dispensing method according to an embodiment of the present invention will be described as follows with reference to FIG. 1 to FIG. 8 and FIG. 14.

As shown in FIG. 14, the single-particle dispensing method according to the present invention includes moving a mixture (S110), separating a particle (S120), measuring an air pressure (S130), rotating a rotating body (S140), and discharging a particle (S150).

In the moving of the mixture (S110), the vacuum pump 1500 is operated to create a vacuum inside the container 1400, and thereby, the particles (P) and the fluid (R) contained in the syringe 1100 move to the rotating body 1320 inside the fixing body 1310.

Then, in the separating of the particle (S120), the fluid (R) moving in the moving of the mixture (S110) is contained in the container 1400 through the particle collector 1321 and the fluid flow path 1322 formed in the rotating body 1320, and the movement of the particles (P) is restricted by the particle collector 1321, so that the particles (P) and the fluid (R) are separated.

In this case, the particles (P) close one end of the fluid flow path 1322, that is, an inlet end of the fluid flow path 1322, so that an operation of the vacuum pump 1500 does not affect the syringe 1100, thus the movement of the fluid (R) and the particles (P) is stopped from moving from the syringe 1100 to the particle separating body 1300.

Thereafter, in the measuring of the air pressure (S130), the pressure sensor 1200 measures the air pressure inside the syringe 1100, and as described above, it senses that the air pressure is not changed as the movement of the movement of the particles (P) and the fluid (R) is stopped.

In the rotating of the rotating body (S140), when the air pressure is not changed in the measuring of the air pressure (S130), the rotating body 1320 is rotated inside the fixing body 1310.

For example, the rotating body 1320 is disposed inside the fixing body 1310 in the first disposition structure in the moving of the mixture (S110), and in the rotating of the rotating body (S140), the rotating body 1320 is rotated in the second disposition structure, that is, so that the particle collector 1321 is connected to the nozzle 1314 and the fluid flow path 1322 is connected to the third hole 1313.

Next, in the discharging of the particle (S150), the air compressor 1600 injects compressed air from the fluid flow path 1322 in the direction of the particle collector 1321, so that the separated particles (P) in the particle collector 1321 are discharged to the outside through the nozzle 1314 of the fixing body 1310.

After discharging the particles (P) in the discharging of the particles (S150), the rotating body 1320 is rotated back to the first disposition structure, and the above-described steps are restarted from the moving of the mixture (S110).

In addition, since the description of the single-particle dispensing method according to the present embodiment is the same as that of the embodiment of the single-particle dispensing device described above, a description thereof will be omitted.

A single-particle dispensing method according to another embodiment of the present invention will be described as follows with reference to FIG. 9 to FIG. 13 and FIG. 15.

As shown in FIG. 15, the single-particle dispensing method according to the present embodiment includes moving a mixture (S210), separating a particle (S220), measuring an air pressure (S230), rotating a rotating body (S240), and discharging a particle (S250).

In the moving of the mixture (S210), the suction driving of the second syringe 2700 is performed to create a vacuum inside the container 2400 connected to the second syringe 2700, and thereby, the particles (P) and the fluid (R) contained inside the first syringe 2100 move to the rotating body 2320 inside the fixing body 2310.

Then, in the separating of the particle (S220), the fluid (R) moving in the moving of the mixture (S210) is contained in the container 2400 through the particle collector 2321 and the fluid flow path 2322 formed in the rotating body 2320, and the movement of the particles (P) is restricted by the particle collector 2321, so that the particles (P) and the fluid (R) are separated.

In this case, the particles (P) close one end of the fluid flow path 2322, that is, an inlet end of the fluid flow path 2322, so that the driving of the second syringe 2700 does not affect the first syringe 2100, thus the movement of the fluid (R) and the particles (P) from moving from the first syringe 2100 to the particle separating body 2300 is stopped.

Thereafter, in the measuring of the air pressure (S230), the pressure sensor 2200 measures the air pressure inside the first syringe 2100, and as described above, it senses that the air pressure is not changed as the movement of the movement of the particles (P) and the fluid (R) is stopped.

In the rotating of the rotating body (S240), when the air pressure is not changed in the measuring of the air pressure (S230), the rotating body 2320 is rotated inside the fixing body 2310.

For example, the rotating body 2320 is disposed inside the fixing body 2310 in the third disposition structure in the moving of the mixture (S210), and in the rotating of the rotating body (S240), the rotating body 2320 is rotated in the fourth disposition structure, that is, so that the particle collector 2321 is connected to the nozzle 2314 and the fluid flow path 2322 is connected to the sixth hole 2312.

Thereafter, in the discharging of the particle (S250), the second syringe 2700 is discharge-driven to inject air in a direction of the particle collector 2321 in the fluid flow path 2322, so that the separated particles (P) in the particle collector 2321 may be discharged to the outside of the fixing body 2310 through the nozzle 2314.

In addition, since the description of the single-particle dispensing method according to the present embodiment is the same as that of another embodiment of the single-particle dispensing device described above, a description thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1100: syringe
2100: first syringe
1200, 2200: pressure sensor
1300, 2300: particle separating body
1310, 2310: fixing body
1311: first hole
1312: second hole
1313: third hole
1314, 2313: nozzle
2311: fifth hole
2312: sixth hole
1320, 2320: rotating body
1321, 2321: particle collector
1322, 2322: fluid flow path
1400, 2400: container
1500: vacuum pump
1600: air compressor
2700: second syringe
R: fluid
P: particle

The invention claimed is:
1. A single-particle dispensing device, comprising:
a first syringe containing particles and fluid therein;
a particle separating body connected to an outlet end of the first syringe and separating the particles from the fluid;
a container connected to the particle separating body and containing the fluid separated in the particle separating body:
an air compressor connected to the particle separating body and injecting compressed air into the particle separating body to discharge the particle separated in the particle separating body, wherein the particle separating body includes a rotating body provided with a particle collector collecting the particle and a fluid flow path formed therein, and a fixing body provided with a nozzle for discharging the particle and rotatably accommodating the rotating body therein.

2. The single-particle dispensing device of claim 1, further comprising:

a pressure sensor measuring a pressure inside the first syringe; and a vacuum pump connected to the container and moving the particles and the fluid contained inside the first syringe in the particle separating body, wherein the rotating body rotates based on the pressure measured by the pressure sensor to move the separated fluid to the container or to discharge the separated particle to the nozzle.

3. The single-particle dispensing device of claim 2, wherein the fixing body is provided with a first hole formed in a first area connected to the first syringe, a second hole formed in a second area facing the first area and connected to the container, and a third hole formed between the first hole and the second hole and formed in a third area connected to the air compressor, and the nozzle is formed in a fourth area facing the third area.

4. The single-particle dispensing device of claim 3, wherein when the pressure inside the first syringe measured by the pressure sensor is changed, the rotating body is disposed inside the fixing body in a first disposition structure in which the particle collector is connected to the first hole and the fluid flow path is connected to the second hole, and when the pressure inside the first syringe measured by the pressure sensor is not changed, the rotating body is disposed inside the fixing body in a second disposition structure in which the particle collector is connected to the nozzle and the fluid flow path is connected to the third hole.

5. The single-particle dispensing device of claim 4, wherein when the rotating body is disposed inside the fixing body in the second disposition structure, the air compressor injects compressed air toward the fluid flow path to discharge the particle in the particle collector through the nozzle.

* * * * *